United States Patent
Shimamura et al.

(10) Patent No.: US 11,867,124 B2
(45) Date of Patent: Jan. 9, 2024

(54) FUEL SUPPLY CONTROL DEVICE

(71) Applicant: IHI Corporation, Koto-ku (JP)

(72) Inventors: Akihiro Shimamura, Tokyo (JP); Naoki Seki, Tokyo (JP); Hirotaka Sugawara, Tokyo (JP); Yasuhiko Yamamoto, Tokyo (JP)

(73) Assignee: IHI Corporation, Koto-ku (JP)

( * ) Notice: Subject to any disclaimer, the term of this patent is extended or adjusted under 35 U.S.C. 154(b) by 35 days.

(21) Appl. No.: 17/427,444

(22) PCT Filed: Dec. 26, 2019

(86) PCT No.: PCT/JP2019/051110
§ 371 (c)(1),
(2) Date: Jul. 30, 2021

(87) PCT Pub. No.: WO2020/162076
PCT Pub. Date: Aug. 13, 2020

(65) Prior Publication Data
US 2022/0128006 A1    Apr. 28, 2022

(30) Foreign Application Priority Data
Feb. 4, 2019  (JP) .................. 2019-017889

(51) Int. Cl.
*F02C 7/22*     (2006.01)
*F04C 14/08*    (2006.01)
*F23K 5/04*     (2006.01)

(52) U.S. Cl.
CPC ............ *F02C 7/22* (2013.01); *F04C 14/08* (2013.01); *F23K 5/04* (2013.01); *F23K 2900/05141* (2013.01)

(58) Field of Classification Search
CPC ...... F02C 7/06; F02C 7/22; F02C 9/30; F01D 25/16; F04C 14/08
See application file for complete search history.

(56) References Cited

U.S. PATENT DOCUMENTS

| 4,177,025 A | 12/1979 | Eisenmann et al. |
| 9,739,208 B2 | 8/2017 | Griffiths et al. |
| 2002/0102163 A1 | 8/2002 | Dudley |
| 2008/0145240 A1 | 6/2008 | Schwarz et al. |
| 2013/0287594 A1 | 10/2013 | Oyori et al. |

(Continued)

FOREIGN PATENT DOCUMENTS

| JP | 47-9801 | 3/1972 |
| JP | 2002-206486 A | 7/2002 |

(Continued)

OTHER PUBLICATIONS

International Search Report dated Mar. 10, 2020 in PCT/JP2019/051110 filed Dec. 26, 2019, 3 pages.

*Primary Examiner* — Arun Goyal
(74) *Attorney, Agent, or Firm* — Oblon, McClelland, Maier & Neustadt, L.L.P.

(57) ABSTRACT

A fuel supply control device (10) is configured to generate an operation amount used for feedback-controlling rotation of a gear pump (3) based on a deviation of a detected fuel flow rate with respect to a target flow rate, wherein the fuel supply control device generates the operation amount such that a rotation speed of the gear pump is equal to or greater than a predetermined lower limit rotation speed Nmin so as to protect a bearing of the gear pump.

4 Claims, 4 Drawing Sheets

(56) References Cited

U.S. PATENT DOCUMENTS

2014/0044561 A1 2/2014 Leiber et al.
2018/0051743 A1 2/2018 Yates

FOREIGN PATENT DOCUMENTS

| | | | |
|---|---|---|---|
| JP | 2008-539682 | A | 11/2008 |
| JP | 2010-223118 | A | 10/2010 |
| JP | 2013-231406 | A | 11/2013 |
| JP | 2014-512626 | A | 5/2014 |
| JP | 2015-52315 | A | 3/2015 |
| JP | 2017-82755 | A | 5/2017 |
| JP | 6137780 | B2 | 5/2017 | ized by a low pressure pump and to supply the

FUEL SUPPLY CONTROL DEVICE

TECHNICAL FIELD

The present disclosure relates to a fuel supply control device.

Priority is claimed on Japanese Patent Application No. 2019-017889, filed Feb. 4, 2019, the content of which is incorporated herein by reference.

BACKGROUND ART

The following Patent Document 1 discloses a fuel supply device for a gas turbine engine. The fuel supply device is configured to supply a desired fuel to a fuel nozzle via a parallel path of a fixed orifice and a pressurizing valve while operating a centrifugal pump and a gear pump by controlling and driving a motor using a motor controller. In addition, the motor controller receives, as a feedback signal, a differential pressure of a fixed orifice, i.e., a pressurizing valve detected by a differential pressure gauge, and feedback-controls a motor based on a difference between the feedback signal and a command signal captured from full authority digital engine control (FADEC).

RELATED ART DOCUMENTS

[Patent Document]
[Patent Document 1]
Japanese Unexamined Patent Application, First Publication No. 2013-231406

SUMMARY

Technical Problem

The gear pump which is mentioned above (a gear pump for fuel supply) employs a journal bearing due to its operating record and durability against pressure ripple generated by the gear. In such a gear pump, when the motor controller (a fuel supply control device) makes the pump rotation speed command value extremely low based on only the needed fuel flow rate, an oil film thickness of the journal bearing may be insufficient depending on a pressurized weight on the pump, which may lead to a decrease in lifetime or galling of the bearing.

In consideration of the above-mentioned circumstances, the present disclosure is directed to minimizing a decrease in lifetime or galling of a fuel supply gear pump.

Solution to Problem

In order to achieve the aforementioned objects, a fuel supply control device of a first aspect of the present disclosure is a fuel supply control device configured to generate an operation amount used for feedback-controlling rotation of a gear pump based on a deviation of a detected fuel flow rate with respect to a target flow rate, wherein the fuel supply control device generates the operation amount such that a rotation speed of the gear pump is equal to or greater than a predetermined lower limit rotation speed Nmin so as to protect a bearing of the gear pump.

According to a second aspect of the present disclosure, the fuel supply control device of the first aspect includes a lower limit value calculator configured to calculate the lower limit rotation speed Nmin based on a pressure-boosted amount and a fuel temperature of the gear pump; an operation amount calculator configured to calculate an operating rotation speed N based on the deviation; and a comparator configured to output larger one of the lower limit rotation speed Nmin and the operating rotation speed N as the final operation amount.

According to a third aspect of the present disclosure, the fuel supply control device of the first aspect includes a pressure-boosted amount calculator configured to calculate a pressure-boosted amount of the gear pump based on an actual rotation speed, a discharge pressure and a fuel temperature of the gear pump; a lower limit value calculator configured to calculate the lower limit rotation speed Nmin based on the pressure-boosted amount and the fuel temperature; an operation amount calculator configured to calculate an operating rotation speed N based on the deviation; and a comparator configured to output larger one of the lower limit rotation speed Nmin and the operating rotation speed N as the final operation amount.

According to a fourth aspect of the present disclosure, in any one aspect of the first to third aspects, the lower limit rotation speed Nmin is given by the following Equation (1) constituted by a viscosity coefficient μ of a lubricant, a surface pressure P, a shaft diameter r, and a minimum gap cmin of the bearing, and a Sommerfeld number S.

$$N\min = \frac{P}{\mu} S \left(\frac{c\min}{r}\right)^2 \quad (1)$$

According to a fifth aspect of the present disclosure, in any one aspect of the first to fourth aspects, the gear pump is a high pressure pump configured to further boost the fuel pressurized by a low pressure pump and to supply the boosted fuel to an engine.

According to a sixth aspect of the present disclosure, in any one aspect of the first to fifth aspects, the gear pump is driven by a motor, and the operation amount is used for operating the motor.

Effects of the Invention

According to the present disclosure, it is possible to minimize a decrease in lifetime and galling of a fuel supply gear pump.

DETAILED DESCRIPTION

Hereinafter, an embodiment of the present disclosure will be described with reference to the accompanying drawings.

First, a fuel supply device F according to the embodiment will be described with reference to FIG. 1. The fuel supply device F is, as shown, a device configured to supply a fuel to a gas turbine G, more specifically, configured to supply a predetermined amount of fuel to a plurality of fuel nozzles K provided in a fuel device of the gas turbine G.

The gas turbine G is an internal combustion engine provided in an aircraft as a power source for flight, and a jet engine configured to obtain a thrust by discharging, to the rear of the aircraft, an exhaust gas obtained in the fuel device. That is, the fuel supply device F according to the embodiment is a device provided in an aircraft.

Figure 1:
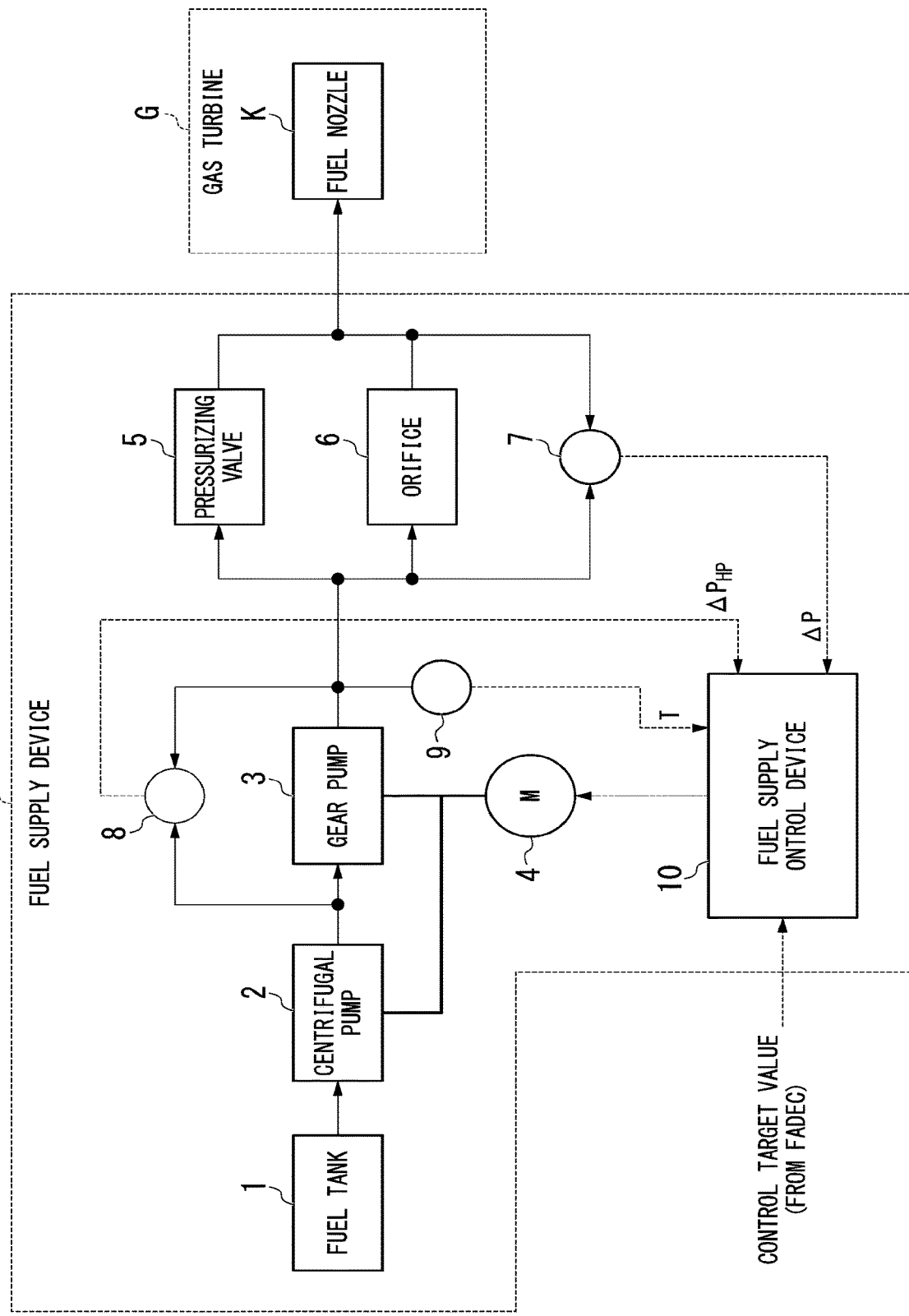
FIG. 1 is a system configuration view of a fuel supply device according to an embodiment of the present disclosure.

As shown in FIG. 1, the fuel supply device F includes a fuel tank 1, a centrifugal pump 2, a gear pump 3, an electric motor (motor) 4, a pressurizing valve 5, an orifice 6, a first differential pressure gauge 7, a second differential pressure gauge 8, a temperature sensor 9 and a fuel supply control device 10. The fuel tank 1 is a container configured to store a predetermined amount of fuel and supplies the fuel to the centrifugal pump 2. The centrifugal pump 2 is a low pressure pump (non-displacement type pump) configured to pump the fuel from the fuel tank 1, boost the fuel to a predetermined pressure and discharge the fuel to the gear pump 3 as a low pressure fuel.

The gear pump 3 is a high pressure pump (displacement type pump) configured to boost the low pressure fuel supplied from the centrifugal pump 2 and discharge the fuel to the fuel nozzles K as a high pressure fuel. While various types of known pumps are known, the gear pump 3 is a pump configured to boost the fuel using rotation of a pair of gears meshed with each other, and rotary shafts of the gears are supported by journal bearings (sliding bearings). In addition, the gear pump 3 uses the fuel as a lubricant by incorporating some of the fuel into the journal bearing.

The electric motor 4 is a power source which rotates and drives the centrifugal pump 2 and the gear pump 3. The electric motor 4 includes an output shaft, and the output shaft of the electric motor 4 is axially coupled to, via a predetermined connecting machine (not shown), a rotary shaft of the centrifugal pump 2 and a rotary shaft of the gear pump 3. That is, a fixed correlation is established between a rotation speed of the electric motor 4 and rotation speeds of the centrifugal pump 2 and the gear pump 3.

The pressurizing valve 5 is provided in the middle of a fuel pipeline that connects a discharge port of the gear pump 3 and an inflow port of the fuel nozzle K. The pressurizing valve 5 is closed when a discharge flow rate of the gear pump 3 is relatively low, and opened when a discharge flow rate of the gear pump 3 exceeds a predetermined value. Like the pressurizing valve 5, the orifice 6 is provided in the middle of the fuel pipeline that connects the discharge port of the gear pump 3 and the inflow port of the fuel nozzle K.

As shown in figures, the pressurizing valve 5 and the orifice 6 form a parallel path via a fuel pipeline. That is, both of an inlet port of the pressurizing valve 5 and an inlet port of the orifice 6 are connected to the discharge port of the gear pump 3 via the fuel pipeline, and both of an outlet port of the pressurizing valve 5 and an outlet port of the orifice 6 are connected to the inflow port of the fuel nozzle K via the fuel pipeline. The pressurizing valve 5 and the orifice 6 constitute a measuring valve configured to detect a flow rate of the fuel supplied from the gear pump 3 to the fuel nozzle K as a fuel supply quantity.

The first differential pressure gauge 7 is a differential pressure transmitter configured to detect a differential pressure between an upstream side (an inlet port side) and a downstream side (a outlet port side) of the pressurizing valve 5 and the orifice 6 as a differential pressure $\Delta P$. The differential pressure $\Delta P$ is a pressure quantity varying according to a fuel flow rate, i.e., a motor rotation speed. That is, the differential pressure $\Delta P$ is a physical quantity corresponding to the fuel flow rate. The first differential pressure gauge 7 outputs the differential pressure $\Delta P$ to the fuel supply control device 10.

The second differential pressure gauge 8 is a differential pressure transmitter configured to detect, as a pressure-boosted amount $\Delta P_{HP}$, a differential pressure between an inflow pressure of the fuel and a discharge pressure in the gear pump 3. The second differential pressure gauge 8 outputs the pressure-boosted amount $\Delta P_{HP}$ to the fuel supply control device 10. The temperature sensor 9 is a detector provided in a discharge port of the gear pump 3 and configured to detect, as a fuel temperature T, a temperature of the fuel in the discharge port of the gear pump 3. The temperature sensor 9 outputs the fuel temperature T to the fuel supply control device 10.

The fuel supply control device 10 controls the electric motor 4 based on the differential pressure $\Delta P$, the pressure-boosted amount $\Delta P_{HP}$, the fuel temperature T and the control target value. The fuel supply control device 10 is a software control device configured to generate an operation amount of the electric motor 4 by executing a predetermined control program using predetermined hardware. Further, the hardware is a storage device configured to store a control program or the like, a central processing unit (CPU) that directly executes a control program, an interface circuit or the like, the interface circuit being interposed between the CPU and the electric motor 4 and between the CPU and the first differential pressure gauge 7 and being configured to give and receive various types of signals. That is, the fuel supply control device 10 includes a storage device, such as a random access memory (RAM), a read only memory (ROM), a hard disk drive (HDD), a solid state drive (SSD), or the like, configured to store a control program, a CPU configured to execute the control program, and an input/output device (interface circuit) interposed between the CPU and the electric motor 4, and between the CPU and the first differential pressure gauge 7, or the like, and configured to give and receive various types signals.

Figure 2:
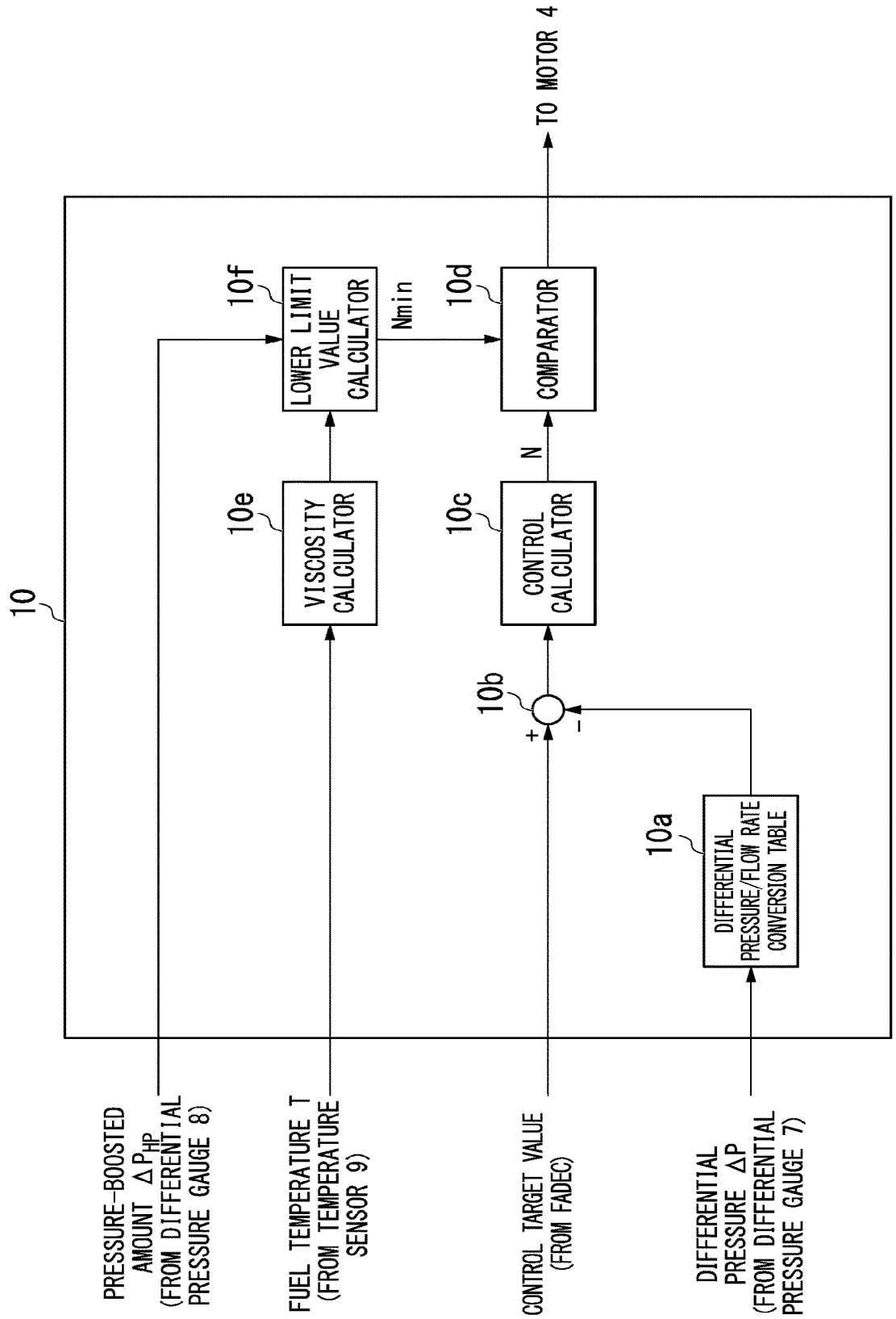
FIG. 2 is a block diagram showing a functional configuration of a fuel supply control device according to the embodiment of the present disclosure.

The fuel supply control device 10 is a functional component realized by cooperation of a control program (software) and hardware, and includes a differential pressure/flow rate conversion table 10a, a subtractor 10b, a control calculator 10c, a comparator 10d, a viscosity calculator 10e and a lower limit value calculator 10f shown in FIG. 2.

The differential pressure/flow rate conversion table 10a is a control table showing a relationship between the differential pressure $\Delta P$ and a supply quantity (fuel supply quantity) of the fuel supplied from the fuel supply device F to the fuel nozzle K, the differential pressure $\Delta P$ being input as a second detection signal to the differential pressure/flow rate conversion table 10a from the first differential pressure gauge 7. That is, the differential pressure/flow rate conversion table 10a includes plural pieces of fuel supply quantity data obtained in advance corresponding to plural pieces of differential pressure data throughout a predetermined band, and outputs a fuel flow rate control amount corresponding to the differential pressure $\Delta P$ to the subtractor 10b by retrieving the data group based on the differential pressure $\Delta P$ input from the first differential pressure gauge 7. The fuel flow rate control amount corresponds to the detected flow rate in the present disclosure.

The subtractor 10b calculates a deviation of a fuel flow rate control amount (fuel flow rate deviation) with respect to a control target value, and outputs the fuel flow rate deviation to the control calculator 10c. That is, the subtractor 10b is configured to calculate, as a control deviation, a difference between a control target value of a fuel flow rate input from a FADEC (not shown) and an actual fuel flow rate. The control target value corresponds to the target flow rate in the present disclosure.

The control calculator 10c generates an operating rotation speed N that is an operation amount of the electric motor 4 by applying predetermined calculation processing (PID calculation processing) to the fuel flow rate deviation input from the subtractor 10b, and outputs the operating rotation speed N to the comparator 10d. Here, since the gear pump 3 is driven to be rotated by the electric motor 4, the operating rotation speed N is an amount that indicates a rotation speed of the electric motor 4, i.e., an amount that indicates a rotation speed of the gear pump 3. The operating rotation speed N is an original operation amount in the fuel supply control device 10 according to the embodiment. Further, the subtractor 10b and the control calculator 10c constitute an operation amount calculator in the present disclosure.

The comparator 10d compares the operating rotation speed N with a lower limit rotation speed Nmin of the gear pump 3 input from the lower limit value calculator 10f, selects larger one of the operating rotation speed N and the lower limit rotation speed Nmin as the final operation amount, and outputs the selected one to the motor 4. That is, the comparator 10d outputs the operating rotation speed N as the final operation amount to the motor 4 when the operating rotation speed N is equal to or greater than the lower limit rotation speed Nmin, and outputs the lower limit rotation speed Nmin as the final operation amount to the motor 4 so as to protect the journal bearing of the gear pump 3 when the operating rotation speed N is smaller than the lower limit rotation speed Nmin. That is, the operation amount is used for operating the motor 4.

The viscosity calculator 10e calculates a viscosity coefficient μ (lubricant viscosity) of a lubricant (fuel) of the journal bearing in the gear pump 3 based on the fuel temperature T input from the temperature sensor 9 and outputs the calculated viscosity coefficient μ to the lower limit value calculator 10f. The viscosity calculator 10e is, for example, a conversion table (fuel temperature/viscosity coefficient conversion table) showing a correlation between the fuel temperature T and the viscosity coefficient μ, and retrieves and outputs the viscosity coefficient μ corresponding to the fuel temperature T.

The lower limit value calculator 10f calculates the lower limit rotation speed Nmin based on the following Equation (1), and outputs the lower limit rotation speed Nmin to the comparator 10d. The Equation (1) indicates properties of the journal bearing in the gear pump 3, and uses a viscosity coefficient μ of a lubricant (fuel), a lower limit rotation speed Nmin, a surface pressure P, a shaft diameter r, a minimum gap cmin and a Sommerfeld number S as parameters.

$$N\text{min} = \frac{P}{\mu} S \left(\frac{c\text{min}}{r}\right)^2 \quad (1)$$

Further, the surface pressure P in the Equation (1) is an amount corresponding to the pressure-boosted amount $\Delta P_{HP}$ detected by the second differential pressure gauge 8. In addition, in these parameters, the shaft diameter r, the minimum gap cmin and the Sommerfeld number S are stored in the lower limit value calculator 10f in advance as property data of the journal bearing of the gear pump 3.

That is, the lower limit value calculator 10f calculates the lower limit rotation speed Nmin based on the Equation (1) using the shaft diameter r, the minimum gap cmin and the Sommerfeld number S which are stored in advance, the viscosity coefficient μ input from the viscosity calculator 10e, and the pressure-boosted amount $\Delta P_{HP}$ (the surface pressure P) input from the second differential pressure gauge 8.

Here, the Equation (1) is an equation in which, in a formula related to the known Sommerfeld number S applied to the journal bearing, a bearing gap c is replaced with a minimum gap cmin that is a seize limit of the journal bearing, and a rotation speed n of a shaft is replaced with a lower limit rotation speed Nmin corresponding to the minimum gap cmin. The lower limit rotation speed Nmin given by the Equation (1) is an amount corresponding to a minimum rotation speed at which the journal bearing of the gear pump 3 does not seize.

Next, an operation of the fuel supply control device 10 according to the embodiment will be described in detail.

As a basis operation, the fuel supply control device 10 feedback-controls the centrifugal pump 2 and the gear pump 3 by generating the operating rotation speed N (operation amount) such that the fuel flow rate control amount is equal to the control target value, the fuel flow rate control amount corresponding to the fuel supply quantity supplied from the gear pump 3 to each of the fuel nozzles K, i.e., the differential pressure ΔP of the first differential pressure gauge 7.

That is, the fuel supply control device 10 rotates the electric motor 4, i.e., the centrifugal pump 2 and the gear pump 3 at a rotation speed in response to the operating rotation speed N by generating the operating rotation speed N based on the differential pressure/flow rate conversion table 10a, the subtractor 10b and the control calculator 10c and outputting the generated operating rotation speed N to the electric the motor 4. As a result, the gear pump 3 discharges the fuel, with an amount equal to the control target value, to each of the fuel nozzles K.

In a basic operation of the fuel supply control device 10, the comparator 10d, the viscosity calculator 10e and the lower limit value calculator 10f are operated to limit a rotation speed of the electric motor 4, i.e., a lower limit value of a rotation speed of the centrifugal pump 2 and the gear pump 3.

That is, while the comparator 10d constantly compares the operating rotation speed N input from the control calculator 10c with the lower limit rotation speed Nmin input from the lower limit value calculator 10f, outputs the operating rotation speed N as an operation amount to the electric motor 4 when the operating rotation speed N is equal to or greater than the lower limit rotation speed Nmin, and outputs the lower limit rotation speed Nmin to the electric motor 4 as the operation amount when the operating rotation speed N is smaller than the lower limit rotation speed Nmin.

As a result, since the rotation speed of the gear pump 3 is maintained at a rotation speed higher than a minimum rotation speed at which the journal bearing does not seize, the journal bearing (sliding bearing) in the gear pump 3 are prevented from seizing. Accordingly, according to the embodiment, it is possible to minimize a decrease in lifetime and seizure of the gear pump 3 for fuel supply.

Further, the present disclosure is not limited to the embodiment, and for example, the following modifications are considered.

(1) While the pressure-boosted amount $\Delta P_{HP}$, i.e., the surface pressure P of the journal bearing in Equation (1) has been obtained by the second differential pressure gauge 8 in the embodiment, the present disclosure is not limited thereto. For example, the pressure-boosted amount $\Delta P_{HP}$ (the surface pressure P) may be calculated by providing a discharge pressure gauge configured to detect a discharge pressure $P_{HP}$ of the gear pump 3 instead of the second differential pressure gauge 8 configured to detect the pressure-boosted amount $\Delta P_{HP}$, by newly providing a speed indicator configured to detect an actual rotation speed Nr of the gear pump 3, and by employing a fuel supply control device 10A including a pressure-boosted amount calculator (differential pressure calculator) 10g as shown in FIG. 3.

Figure 3:
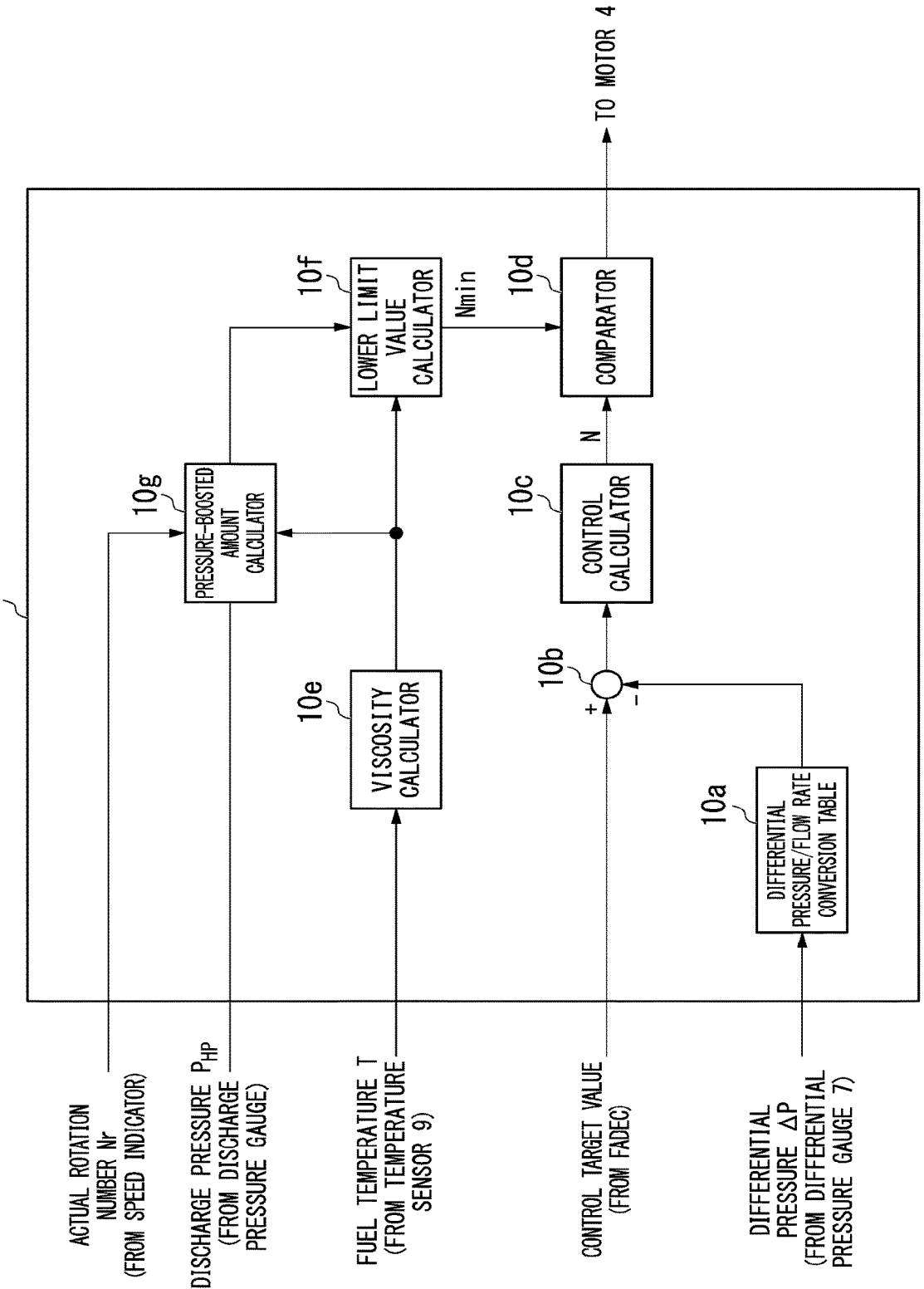
FIG. 3 is a block diagram showing a functional configuration of a fuel supply control device according to a modification of the embodiment of the present disclosure.

That is, in the fuel supply control device 10A shown in FIG. 3, the pressure-boosted amount calculator 10g calculates the pressure-boosted amount $\Delta P_{HP}$ (the surface pressure P) from the viscosity coefficient μ of the lubricant (fuel) input from the viscosity calculator 10e, the discharge pressure $P_{HP}$ input from the discharge pressure gauge, and the actual rotation speed Nr input from the speed indicator. Then, the lower limit value calculator 10f in the fuel supply control device 10A calculates the lower limit rotation speed Nmin by substituting the pressure-boosted amount $\Delta P_{HP}$ (the surface pressure P), which is input from the pressure-boosted amount calculator 10g, into Equation (1).

(2) While the gear pump 3 including the journal bearing (sliding bearing) using the fuel as the lubricant has been described in the embodiment, the present disclosure is not limited thereto. That is, the present disclosure may also be applied to a gear pump including a type of journal bearing (sliding bearing) using a lubricant different from a fuel.

(3) In addition, the bearing of the gear pump 3 is not limited to the journal bearing (sliding bearing). That is, the present disclosure may also be applied to a gear pump employing other type of bearing than the journal bearing (sliding bearing). However, in this case, the lower limit rotation speed Nmin is not set by employing Equation (1) related to the journal bearing (sliding bearing), and needs to be set by employing an equation specialized for a bearing to be used.

(4) While the gas turbine G is a supply destination of the fuel in the embodiment, the present disclosure is not limited thereto. Other type of engine than the gas turbine G may be a supply destination of a fuel.

Figure 4:
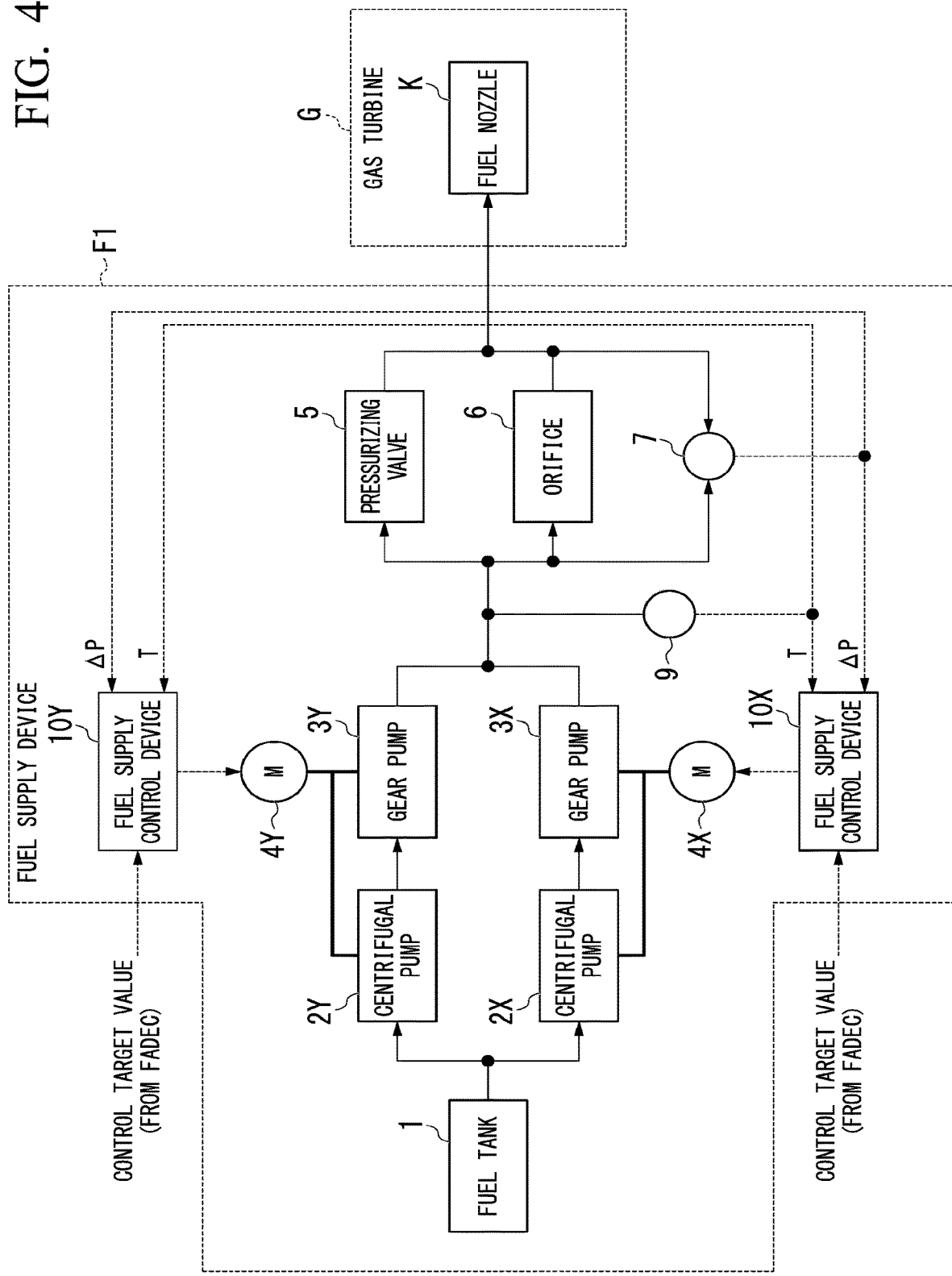
FIG. 4 is a system configuration view of a fuel supply device according to the modification of the embodiment of the present disclosure.

(5) While the fuel supply device F has been constituted by a single system including the centrifugal pump 2, the gear pump 3 and the electric motor 4 in the embodiment, in order to secure redundancy, a fuel supply device F1 with a dual system as shown in FIG. 4 may be employed. That is, the fuel supply device F1 includes a first oil feeding system constituted by a centrifugal pump 2X, a gear pump 3X, an electric motor 4X and a fuel supply control device 10X, and a second oil feeding system constituted by a centrifugal pump 2Y, a gear pump 3Y, an electric motor 4Y and a fuel supply control device 10Y.

The fuel supply control device 10X feedback-controls the electric motor 4X by generating the operating rotation speed N1 based on the fuel temperature T input from the temperature sensor 9, the differential pressure ΔP input from the first differential pressure gauge 7 and the control target value input from the FADEC. Meanwhile, the fuel supply control device 10Y feedback-controls the electric motor 4Y by generating the operating rotation speed N2 based on the fuel temperature T input from the temperature sensor 9, the differential pressure ΔP input from the first differential pressure gauge 7 and the control target value input from the FADEC.

The electric motor 4X is rotated according to the operating rotation speed N1 input from the fuel supply control device 10X to rotate the centrifugal pump 2X and the gear pump 3X at a rotation speed in response to the operating rotation speed N1. Meanwhile, the electric motor 4Y is rotated according to the operating rotation speed N2 input from the fuel supply control device 10Y to rotate the centrifugal pump 2Y and the gear pump 3Y at a rotation speed in response to the operating rotation speed N2.

Conventionally, the fuel supply device F1 supplies a fuel with a flow rate needed by the gas turbine G in which the first oil feeding system and the second oil feeding system are parallelly operated. That is, in the fuel supply device F1, the first oil feeding system and the second oil feeding system function independently, and the fuels with the flow rates needed by the gas turbine G are supplied separately from the first oil feeding system and the second oil feeding system. In addition, in the fuel supply device F1, when the function of the first oil feeding system or the second oil feeding system is stopped, the one of the oil feeding systems that does not stop supplies all the fuel needed by the gas turbine G. Further, according to necessity, the fuel supply device may be configured as a triple system or a quadruple system.

INDUSTRIAL APPLICABILITY

The present disclosure can be used in a fuel supply device that minimizes a decrease in lifetime or seizure of a fuel supply gear pump.

REFERENCE SYMBOLS

F, F1 Fuel supply device
G Gas turbine
K Fuel nozzle
1 Fuel tank
2, 2X, 2Y Centrifugal pump
3, 3X, 3Y Gear pump (fuel supply gear pump)
4, 4X, 4Y Electric motor (motor)
5 Pressurizing valve
6 Orifice
7 First differential pressure gauge
8 Second differential pressure gauge
9 Temperature sensor
10, 10A, 10X, 10Y Fuel supply control device
10a Differential pressure/flow rate conversion table
10b Subtractor
10c Control calculator
10d Comparator
10e Viscosity calculator
10f Lower limit value calculator
10g Differential pressure calculator (pressure-boosted amount calculator)

The invention claimed is:

1. A fuel supply control device configured to generate an operation amount used for feedback-controlling rotation of a gear pump based on a deviation of a detected flow rate of a fuel with respect to a target flow rate,
wherein the fuel supply control device generates the operation amount such that a rotation speed of the gear pump is equal to or greater than a lower limit rotation speed Nmin so as to protect a bearing of the gear pump, wherein the fuel supply control device comprises:
- a lower limit value calculator configured to calculate the lower limit rotation speed Nmin using a viscosity coefficient of a lubricant of the bearing calculated based on a fuel temperature of the gear pump, a pressure-boosted amount of the gear pump, a shaft diameter and a minimum gap of the bearing, and a Sommerfeld number,
- an operation amount calculator configured to calculate an operating rotation speed N based on the deviation; and
- a comparator configured to output larger one of the lower limit rotation speed Nmin and the operating rotation speed N as the operation amount of an actual rotation speed, and
- wherein the lower limit rotation speed Nmin is given by the following Equation (1) constituted by a viscosity coefficient μ of the lubricant of the bearing calculated based on the fuel temperature of the gear pump, the pressure-boosted amount P of the gear pump, a shaft diameter r, the minimum gap of the bearing cmin, and the Sommerfeld number S:

$$N\min = \frac{P}{\mu} S \left[ \frac{c\min}{r} \right]^2 \quad (1)$$

2. The fuel supply control device according to claim 1, comprising:
   a pressure-boosted amount calculator configured to calculate a pressure-boosted amount of the gear pump based on the actual rotation speed, a discharge pressure and the fuel temperature of the gear pump.

3. The fuel supply control device according to claim 1, wherein the gear pump is a high pressure pump configured to further boost a pressure of the fuel pressurized by a low pressure pump and to supply the fuel boosted by the high pressure pump to an engine.

4. The fuel supply control device according to claim 1, wherein the gear pump is driven by a motor, and
the operation amount is used for operating the motor.

* * * * *